(12) United States Patent
Corden et al.

(10) Patent No.: US 10,780,608 B2
(45) Date of Patent: Sep. 22, 2020

(54) PROCESS FOR PREPARING MOULDED ARTICLES FROM FIBRE-REINFORCED COMPOSITE MATERIALS—II

(71) Applicant: CYTEC INDUSTRIES INC., Woodland Park, NJ (US)

(72) Inventors: Thomas Joseph Corden, Derbyshire (GB); John Walter Andrew Hackett, South Staffs (GB)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 624 days.

(21) Appl. No.: 15/164,387

(22) Filed: May 25, 2016

(65) Prior Publication Data

US 2016/0346959 A1    Dec. 1, 2016

(30) Foreign Application Priority Data

May 29, 2015    (GB) .................................. 1509292.7

(51) Int. Cl.
*B29B 11/16* (2006.01)
*B29C 70/38* (2006.01)
(Continued)

(52) U.S. Cl.
CPC ............ *B29B 11/16* (2013.01); *B29C 70/083* (2013.01); *B29C 70/38* (2013.01); *B29C 70/386* (2013.01);
(Continued)

(58) Field of Classification Search
CPC ..... B29B 11/16; B29C 70/386; B29C 70/541; B29C 70/38; B29K 2307/04;
(Continued)

(56) References Cited

U.S. PATENT DOCUMENTS

| 5,209,804 A | 5/1993 | Trudeau |
| 6,013,730 A | 1/2000 | McGrail et al. |

(Continued)

FOREIGN PATENT DOCUMENTS

| EP | 0311349 | 4/1989 |
| EP | 0365168 | 4/1990 |

(Continued)

*Primary Examiner* — Nahida Sultana
(74) *Attorney, Agent, or Firm* — Thi Dang (57) ABSTRACT

The present invention relates to low or zero-tack composite materials such as pre-pregs and their use in automated manufacturing, particularly robotic pick and place. The present invention further relates to an automated process for preparing an article, particularly a molded article, from a fiber-reinforced composition material.

The molded articles prepared by the process described herein are particularly suitable as components for transport applications, and particularly the automotive industry. The automotive components prepared by the present invention are particularly suitable as mid- or high-volume automotive parts, in which cost and speed of production are paramount. The present invention provides a process in which the cutting and handling of pre-preg materials is greatly simplified, providing advantages of efficiency and economy. The lay-up time according to the present invention is significantly reduced, allowing a reduction in the unit cost per component and/or allowing the high volume of component production desired in the automotive industry.

18 Claims, 3 Drawing Sheets

(51) Int. Cl.
  *B29C 70/54*   (2006.01)
  *B29C 70/08*   (2006.01)
  *B29K 105/08*   (2006.01)
  *B29K 63/00*   (2006.01)
  *B29K 105/00*   (2006.01)
  *B29K 307/04*   (2006.01)

(52) U.S. Cl.
  CPC ........ *B29C 70/541* (2013.01); *B29K 2063/00* (2013.01); *B29K 2105/0094* (2013.01); *B29K 2105/089* (2013.01); *B29K 2105/0872* (2013.01); *B29K 2307/04* (2013.01); *B29K 2995/0063* (2013.01); *B29K 2995/0065* (2013.01); *B29K 2995/0097* (2013.01)

(58) Field of Classification Search
  CPC ...... B29K 2105/089; B29K 2995/0063; B29K 2063/00; B29K 2105/0094; B29K 2995/0065; B29K 2995/0097; B29K 2105/0872
  See application file for complete search history.

(56) References Cited

U.S. PATENT DOCUMENTS

| | | | |
|---|---|---|---|
| 7,341,086 B2 | 3/2008 | Nelson et al. | |
| 7,488,437 B2 * | 2/2009 | Habisreitinger | B29C 70/46 264/138 |
| 7,588,438 B2 * | 9/2009 | Xu | G01N 1/04 425/313 |
| 9,421,693 B2 * | 8/2016 | Baechtold | B26D 7/0675 |
| 9,808,997 B1 * | 11/2017 | Rotter | B29C 70/44 |
| 9,821,474 B2 * | 11/2017 | Reinhold | B65H 3/0816 |
| 2005/0042323 A1 | 2/2005 | Habisreitinger et al. | |
| 2009/0291278 A1 * | 11/2009 | Kawabe | B29C 43/305 428/213 |
| 2011/0287246 A1 * | 11/2011 | Arai | C08J 5/24 428/300.1 |
| 2012/0114899 A1 | 5/2012 | Ellis | |
| 2013/0075025 A1 * | 3/2013 | Guitton | B29C 70/68 156/245 |
| 2014/0361467 A1 * | 12/2014 | Murai | B29C 70/48 264/571 |
| 2015/0115505 A1 * | 4/2015 | Jones | B29C 70/345 264/511 |
| 2015/0232663 A1 * | 8/2015 | Beard | C08L 71/00 442/136 |
| 2015/0266220 A1 * | 9/2015 | Fideu | B29C 33/02 264/328.16 |
| 2017/0341357 A1 * | 11/2017 | Dalal | B32B 37/02 |

FOREIGN PATENT DOCUMENTS

| | | |
|---|---|---|
| EP | 0486197 | 5/1992 |
| EP | 1595689 | 11/2005 |
| JP | H05147118 A | 6/1993 |
| JP | 2008517810 A | 5/2008 |
| WO | 02094564 | 11/2002 |
| WO | 2006049782 A2 | 5/2006 |
| WO | 0027632 | 5/2008 |
| WO | 2012010293 A1 | 1/2012 |
| WO | 2012100980 | 8/2012 |
| WO | 2014035579 A1 | 3/2014 |

* cited by examiner

PROCESS FOR PREPARING MOULDED ARTICLES FROM FIBRE-REINFORCED COMPOSITE MATERIALS—II

This patent application claims priority to pending UK Serial 1509292.7 filed May 29, 2015, incorporated herein in its entirety.

The present invention relates to fibre-reinforced composite materials such as pre-pregs and their use in automated manufacturing, particularly robotic pick and place. The present invention further relates to an automated process for preparing an article, particularly a moulded article, from a fibre-reinforced composition material.

The automated handling of fibre-reinforced composite materials (commonly referred to in the art as pre-pregs, or resin-impregnated reinforcement fibre fabrics or mats) is well established. Disclosures which teach such methods and devices include US-2005/0042323-A and U.S. Pat. No. 7,341,086. However, conventional fibre-reinforced composite materials are designed to be sticky or tacky at room temperature in order that plies of pre-pregs can be laminated onto a surface, such as a mould tool or upon other plies of pre-preg in such a way that the pre-preg remains in place until its position is secured prior to cure with further tooling or with cure-related consumables, vacuum bagging etc. While this may assist hand lamination, and indeed by a requirement in some automated processes, it nevertheless requires protective interleaves, such as polymer sheets or paper, to enable the material to be easily unrolled, cut and handled. For automated processes, such as robotic pick and place, the task of removing the interleaves is a complicated, unreliable and time-consuming step. It would therefore be desirable to avoid the use of such interleaves.

One solution to the problem has been to decrease the temperature of the working environment, thereby increasing the viscosity and reducing the tack of the fibre-reinforced composite material. Below a certain temperature, the pre-preg will exhibit reduced tack but additionally will be brittle and inflexible, due to the viscosity of the resin approaching the point where it becomes a glassy solid material as opposed to mobile and resinous. To achieve a pre-preg with low or no tack at ambient temperature would conventionally require the thermosetting formulation to be solid or very close to being solid at the ambient temperature. Pre-pregs which are brittle and inflexible, or in a brittle and inflexible state, are difficult to wind and unwind around a core, and typically compromise processes which involve positioning the material onto a mould tool. Moreover, the fibre-reinforced composite material typically retains at least some of its tack, resulting in the possibility of resin build-up on manufacturing equipment and deviation from strict resin areal weight quality control requirements, and hence the need for interleaves remains. Furthermore, this solution increases manufacturing costs and may introduce moisture and vapour issues, as well as requiring additional machine adaptations and health and safety considerations.

It would be desirable for the fibre-reinforced composite materials used in such automated processes to exhibit a tack-free surface, which would greatly improve the handling and cutting of these materials, as well as reducing or eliminating resin build-up on the manufacturing equipment when producing moulded articles therefrom, particularly while retaining flexibility. It is particularly desired to increase the speed and/or reduce the cost of the preparation of moulded articles prepared from fibre-reinforced composite materials.

According to a first aspect of the present invention, there is provided an automated process for preparing a moulded article from a plurality of pre-pregs comprising the steps of:
(a) providing a mould;
(b) disposing a laminar pre-preg into or onto said mould by an automated conveying member which applies a prehensile force to said pre-preg to convey said pre-preg from a starting position to a finishing position, wherein said finishing position is in or on said mould;
(c) repeating step (b) at least once to dispose one or more further pre-pregs into or onto said mould;

wherein said laminar pre-preg is a fibre-reinforced curable composite material, wherein said pre-preg comprises a core layer having a first surface and a second surface and further comprises a surface layer disposed directly on each of said first and second surfaces of said core layer, wherein said core layer comprises one or more layer(s) of reinforcing fibres impregnated with a curable resin, and wherein said surface layer comprises a dry-fibre veil having an areal weight from about 10 to about 50 $g/m^2$, the dry-fibre veil being adhered to the curable resin of the core layer; and wherein the prehensile force is applied by said automated conveying member directly to the external surface of said surface layer of said pre-preg.

According to a second aspect of the invention, there is provided a laminar pre-preg of fibre-reinforced curable composite material, wherein said pre-preg comprises a core layer having a first surface and a second surface and further comprises a surface layer disposed directly on each of said first and second surfaces of said core layer, wherein said core layer comprises one or more layer(s) of reinforcing fibres impregnated with a curable resin, and wherein said surface layer comprises a dry-fibre veil having an areal weight from about 10 to about 50 $g/m^2$, the dry-fibre veil being adhered to the curable resin of the core layer.

In the present invention, a dry-fibre veil is used in place of traditional protective interleaves. The term "dry" means that the external surface of the fibre veil is resin-free. The external surface of the fibre veil is the surface which is contacted by the conveying member. The dry-fibre veil is disposed on each of the outer surfaces of the fibre-reinforced composite material, and forms the outer surfaces of the laminar pre-preg, and therefore the outer surfaces of the pre-preg are advantageously tack-free at ambient temperature (i.e. a temperature from about 15 to about 30° C., more typically 18 to about 23° C., and preferably 20° C.). Thus, the outer surfaces of the pre-preg, prior to curing, i.e. the pre-pregs that are disposed into or onto the mould in step (b) of the process, are tack-free. As used herein, the term "tack-free" means that two pre-preg plies of dimensions 100×100 mm do not adhere together when placed one on top of the other, by hand, after experiencing a weight of 1 kg applied evenly across the surface area of the two-ply assembly for 1 minute at an ambient temperature of 20° C.

The dry-fibre veil remains on the surface of the fibre-reinforced composite material to become part of the cured laminate. The dry-fibre veil advantageously allows the material to be handled by automated processes without the need to remove protective interleaves traditionally employed, thereby simplifying the cutting and handling of the fibre-reinforced composite material, and avoiding resin build-up on manufacturing equipment. Moreover, the absence of the traditional protective interleaves reduces waste and thereby manufacturing costs since it is no longer necessary to dispose of the interleaves once removed. Furthermore, the fibre-reinforced composite material is able to be handled at room temperature, thereby avoiding the problems associated with chilled working environments.

The core layer of the pre-preg used in the present invention suitably consists of one or more layer(s) of reinforcing fibres impregnated with a curable resin. The core layer is preferably a layer in which said layer(s) of reinforcing fibres are fully impregnated with said curable resin. As used herein, the term "fully impregnated" means that the curable resin is present throughout the cross-section of the core layer, i.e. the curable resin is present in interstices between the reinforcing fibres or bundles of reinforcing fibres throughout the cross-section of the core layer. It will be appreciated that the term "fully impregnated" does not require that the entire surface area of all reinforcing fibres in the core layer are completely wet-out in the pre-preg prior to curing, only that that the curable resin is dispersed throughout the cross-section of the core layer.

The present invention advantageously provides an automated process wherein the pre-preg is not associated with a protective removable interleave disposed on an external surface of the pre-preg. In addition, the present automated process does not comprise a step of removing the protective removable interleave.

Fibre-containing surface layers have previously been used in curable composite materials. For instance, WO-02/094564-A discloses a pre-preg laminate comprising a surface material for improving the cosmetic quality of the outer surface of the underlying resin moulding material in the cured laminate. The surface material is applied to one surface of a moulding material comprising a reinforcement material and a resin material. The surface material typically comprises an inner layer of a surface resin material, which contacts the conventional reinforced resin layer, and an outer layer comprising a resin conducting layer comprising a resin retention structure, which contacts the surface of the mould. The resin conducting layer is a porous or permeable fibre-containing light-weight woven or non-woven layer which allows venting of the underlying resin and retention of high volumes of resin on or close to the mould surface during curing, thereby preventing de-wetting of the mould surface during curing and reducing the formation of surface irregularities in the cured laminate.

EP-1595689-A discloses a fibrous scrim partially embedded into a conventional pre-preg comprising fibrous reinforcement and heat-curable resin, wherein the scrim provides pathways to allow air to escape during processing, thereby resulting in a reduction in the void content of the cured laminate. There is no mention of tack-free surfaces and protective polymeric interleaves are still proposed for use on one or both sides of the pre-preg-scrim assembly.

WO-00/27632-A discloses a pre-preg comprising a central resin film sandwiched between two fibrous layers, wherein during processing the resin impregnates the fibrous layers. However, the central resin film is not a resin-impregnated reinforcing fibrous layer, and there is no mention of automated pick-and-place processes to manufacture moulded articles. Protective polyethylene interleaves are still proposed for use on with the pre-preg.

THE CORE LAYER

As described hereinabove, the laminar pre-preg used in the present invention comprises one or more layer(s) of reinforcing fibres and a curable resin.

The fibres in a reinforcing fibre layer are preferably in the form of continuous fibres, filaments, tows, bundles, sheets, plies, or combinations thereof. The precise specification of the fibres, for instance their orientation and/or density can be specified to achieve the optimum performance for the intended use of the pre-pregs. Continuous fibres may adopt any of unidirectional (aligned in one direction), multi-directional (aligned in different directions), non-woven, woven, knitted, stitched, wound, and braided configurations. Woven fibre structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin. In one preferred embodiment, the layer(s) of reinforcing fibres used in the present invention comprise woven fibre structures comprising a plurality of woven tows arranged substantially orthogonally. In a further preferred embodiment, the layer(s) of reinforcing fibres used in the present invention comprise fibre structures wherein the fibres are arranged unidirectionally. In a further preferred embodiment, the layer(s) of reinforcing fibres used in the present invention comprise fibre structures wherein the fibres are arranged in other orientations, such as tri-axial wherein fibres are arranged in three directions, such as 0°, +60°, −60.°

The reinforcing fibres are preferably selected from, but not limited to, fibres of glass (including Electrical or E-glass), carbon (particularly graphite), aramid, polyamide, high-modulus polyethylene (PE), polyester, poly-p-phenylene-benzoxazole (PBO), boron, quartz, basalt, ceramic, and combinations thereof. Carbon fibre is particularly suitable. For the fabrication of high-strength composite materials, e.g. for aerospace and automotive applications, it is preferred that the reinforcing fibres have a tensile strength of greater than 3500 MPa.

The core layer preferably comprises from about 30 to about 70 wt %, preferably from about 35 to 65 wt %, preferably from about 40 to about 60 wt %, preferably from about 45% to about 55 wt %, typically from about 47 to about 54 wt % reinforcing fibres, by total weight of the core layer.

The core layer preferably comprises from about 30 to about 70 wt % of curable resin, preferably from about 35 to about 65 wt %, preferably from about 40 to about 60 wt %, and more preferably from about 45 to about 55 wt %, more preferably from about 46 to about 53 wt %, by total weight of the core layer. The more and most preferred resin fractions are particularly advantageous for achieving the desired permeability characteristics described herein.

The amount of reinforcing fibres plus the amount of curable resin should equal 100%.

The curable resin may be selected from curable resins conventionally known in the art. One or more curable resins may be present in the core layer. The formulation of the curable resin can be specified to achieve the optimum performance for the intended use of the pre-pregs. Suitable curable resins may be selected from the group consisting of an epoxy resin, an addition-polymerisation resin (for instance a bis-maleimide resin), a benzoxazine resin, a formaldehyde condensate resin (especially a formaldehyde-phenol or urea-formaldehyde resin), a vinyl ester resin, resins of, 1,3,5-triazine-2,4,6-triamine (melamine), a cyanate resin, an isocyanate resin, a phenolic resin and mixtures of two or more thereof. Preferably the curable resins are selected from epoxy, phenolic or cyanate ester resins, particularly epoxy and phenolic resins, and particularly epoxy resins. An epoxy resin is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof. Examples of addition-polymerisation resins are acrylics, vinyls, bis-maleimides, and unsaturated polyesters. Examples of formaldehyde condensate resins are urea, melamine and phenols.

The particularly preferred epoxy resins may be monofunctional, difunctional, or multifunctional epoxy resins. As used herein, the term "multifunctional" epoxy resin is a resin which has a functionality of greater than two. Preferred multifunctional resins are at least trifunctional, typically trifunctional or tetrafunctional, although epoxy resins having greater functionality may also be used, for instance those having 5 or 6 epoxy groups. The term "multi-functional" encompasses resins which have non-integer functionality, for instance epoxy phenol novolac (EPN) resins, as known in the art. The epoxy resin may comprise monofunctional, difunctional and/or multifunctional (typically trifunctional or tetrafunctional) epoxy resins. Preferably the curable resin comprises one or more difunctional epoxy resin(s) (and preferably at least two difunctional epoxy resin(s)) optionally in combination with one or more multifunctional (typically trifunctional or tetrafunctional) epoxy resin(s). In a preferred embodiment, the curable resin comprises one or more difunctional epoxy resin(s) (and preferably at least two difunctional epoxy resin(s)) optionally in combination with one or more trifunctional epoxy resin(s) and/or one or more tetrafunctional epoxy resin(s). In a further preferred embodiment, the curable resin comprises one or more multifunctional epoxy resin(s) (typically trifunctional and/or tetrafunctional).

Suitable difunctional epoxy resins include those based on: diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. Difunctional epoxy resins are preferably selected from diglycidyl ether of Bisphenol F (DGEBF), diglycidyl ether of Bisphenol A (DGEBA), diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenols, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl diamino diphenylmethane (TGDDM) and N,N,N',N'-tetraglycidyl-m-xylenediamine.

In a preferred embodiment, the curable resin is a mixture of the following epoxy resins:
(i) a first difunctional epoxy resin, preferably selected from Bisphenol A epoxy resins, and preferably DGEBA; and/or
(ii) a second difunctional epoxy resin, preferably selected from Bisphenol F epoxy resins, and preferably DGEBF;

which are preferably in combination with one or more of the following epoxy resin(s):
(iii) an epoxy phenol novolac (EPN) resin;
(iv) an epoxy cresol novolac (ECN) resin;
(v) a trifunctional epoxy resin, preferably triglycidyl aminophenol (preferably triglycidyl para-aminophenol (TGPAP);
(vi) a tetrafunctional epoxy resin, preferably tetraglycidyl diamino diphenyl methane (TGDDM).

Thus, an epoxy resin may be selected from N,N,N',N'-tetraglycidyl diamino diphenylmethane (e.g. grades MY 9663, MY 720 or MY 721; Huntsman); N,N,N',N'-tetraglycidyl-bis(4-aminophenyl)-1,4-diiso-propylbenzene (e.g. EPON 1071; Shell Chemical Co.); N,N,N',N'-tetraglycidyl-bis(4-amino-3,5-dimethylphenyl)-1,4-diisopropylbenzene, (e.g. EPON 1072; Shell Chemical Co.); triglycidyl ethers of p-aminophenol (e.g. MY 0510; Ciba-Geigy); diglycidyl ethers of bisphenol A based materials such as 2,2-bis(4,4'-dihydroxy phenyl) propane (e.g. DE R 661 (Dow), or Epikote 828 (Shell)) and higher molecular weight diglycidyl ethers of bisphenol A based materials such as those with an epoxy equivalent weight of 400-3500 g/mol (e.g. Epikote 1001 and Epikote 1009), and Novolak resins preferably of viscosity 8-20 Pa s at 25° C.; glycidyl ethers of phenol Novolak resins (e.g. DEN 431 or DEN 438; Dow); diglycidyl 1,2-phthalate (e.g. GLY CEL A-100); diglycidyl derivative of dihydroxy diphenyl methane (Bisphenol F) (e.g. PY 306; Ciba Geigy). Other epoxy resin precursors include cycloaliphatics such as 3',4'-epoxycyclohexyl-3,4-epoxycyclohexane carboxylate (e.g. CY 179; Ciba Geigy) and those in the "Bakelite" range of Union Carbide Corporation.

Cyanate ester resins and phenolic resins may be selected from those conventionally used in the art, for instance such as those disclosed in WO-2012/100980-A.

The curable resin preferably also comprises one or more curing agent(s), as are known in the art, particularly for epoxy resins. Suitable curing agents are disclosed, for example, in EP-A-03 1 1349, EP-A-0486197, EP-A-0365 168 or in U.S. Pat. No. 6,013,730, the disclosures of which are incorporated herein by reference. A catalyst may also be present, as is conventional in the art. Suitable curing agents include anhydrides, particularly poly carboxylic anhydrides, and amines. An amine curing agent suitable has a molecular weight of up to 500 per amino group. An aromatic amine or a guanidine derivative is particularly suitable. Aromatic amines include, for example. 1,3-diaminobenzene, 4,4'-diaminodiphenylmethane. Amine compounds of particular utility as curing agents are the sulphones, e.g. 4,4'-diaminodiphenyl sulphone (4,4' DDS), and 3,3'-diaminodiphenyl sulphone (3,3' DDS). Other curing agents include methylenedianiline; bis(4-amino-3,5-dimethylphenyl)-1,4-diisopropylbenzene (EPON 1062; Shell Chemical Co.); bis(4-aminophenyl)-1,4-diisopropylbenzene (EPON 1061; Shell Chemical Co.); 4-chlorophenyl-N,N-dimethyl-urea (e.g. Monuron); 3,4-dichlorophenyl-N,N-dimethyl-urea (e.g. Diuron™) and dicyanodiamide (Amicure™ CG 1200; Pacific Anchor Chemical). Bisphenol chain extenders, such as bisphenol-S or thiodiphenol, are also particularly useful as curing agents for epoxy resins. Dicyandiamide and its use with suitable catalysts such as imidazoles and their salts and/or urones such as 2,4-di(N,N-dimethylureido) toluene; 2,6-di(N,N-dimethylureido) toluene (Dyhard™ UR500) are of particularly utility in the present invention.

The curable resin may further contain a relatively minor amount of conventional additives, such as toughening agents, including particulate toughening agents, for instance aggregates such as glass beads, rubber particles and rubber-coated glass beads, filler such as polytetrafluoroethylene, silica, graphite, boron nitride, mica, talc and vermiculite, pigments, nucleating agents, flame retardants such as alumina trihydrate (ATH) and magnesium hydroxide (MDH), and stabilisers such as phosphates. Liquid rubbers having reactive groups may also be used. Thermoplastic toughening additives include polyarylethersulfones (PESs), polysulfones (PSFs), polyvinylformals (PVFs), polymethylmethacrylates (PMMAs), polyimides (PIs), polyetherimides (PEIs) and polyethylene oxides (PEOs). It will be appreciated that, where such additives are present, they are typically added to the pre-preg via their incorporation in the curable resin. The total amount of said additives in the curable resin is such that said additives constitute typically no more than about 20 wt %, more typically no more than about 10 wt %, by total weight of the core layer.

Preferably, the curable resin exhibits a cure conversion (measured as described herein) of at least 90%, preferably at least 95%, preferably at least 98%, when cured at a cure temperature of at least 100° C., preferably at least 120° C., preferably greater than 120° C., preferably at least 125° C., preferably at least 130° C., and preferably in the range of from about 130° C. to about 150° C., wherein the cure cycle has a duration of no more than 30 minutes, preferably no more than 15 minutes, preferably no more than 10 minutes, preferably no more than 5 minutes. Preferably, the cure conversion is at least 90%, preferably at least 95%, preferably at least 98% when cured at a temperature in the range of from 130° C. to 150° C. for a period of no more than 10 minutes, preferably for a period of no more than 5 minutes.

Preferably, the core layer exhibits an areal weight of from about 300 to about 1500 gsm, preferably from about 600 to about 1300 gsm.

Preferably, the thickness of the core layer is no more than about 1000 μm, preferably at least about 150 μm, preferably from about 400 μm to about 800 μm.

The core layer of the pre-preg is manufactured by any suitable technique known in the art, such that the curable resin is contacted with the fibrous reinforcing agent in one or more of the forms noted above under conditions of temperature and pressure sufficient to cause the curable resin to flow and infuse or impregnate the fibres. The term "impregnate" refers to the introduction of a curable resin composition to reinforcement fibres so as to introduce the curable resin between the interstices of the fibres and/or fully or partially encapsulate the fibres. Thus, the pre-preg is prepared by the general method of:
  a. providing a dry fibre preform comprised of one or more layers of reinforcing fibres;
  b. impregnating said dry fibre preform with a curable resin, wherein said curable resin is liquid.

In general terms, the dry fibre preform is impregnated with the curable resin by heating the curable resin to its molten state and disposing said molten first curable resin on and into said dry fibre preform. Typical impregnating methods include:
  (1) Continuously moving the reinforcing fibres through a bath of solvated resin composition to fully or substantially fully wet out the fibres; followed by the application of heat to evaporate the solvent; or
  (2) Pressing top and/or bottom resin films against a web of reinforcing fibres under elevated temperature.

Preferably, the core layer is prepared by the hot-melt casting technique, particularly wherein low permeability is desired.

The resulting core layer is typically a pliable and tacky sheet of material.

The Surface Layer

A surface layer comprises and preferably consists of a dry-fibre veil. A single surface layer may be constituted by a single dry-fibre veil or by a plurality (preferably no more than two) of separate dry-fibre veils.

The dry-fibre veil may be made of any suitable material. Suitable materials for the dry-fibre veil include woven or non-woven fabrics, preferably non-woven fabrics, of fibrous material.

Preferably, the fibres comprise or consist of carbon-fibre (including recycled carbon-fibre), glass-fibre, fibres selected from boron, basalt, quartz, cellulose, ceramic fibre, or thermoplastic polymer fibre, and mixtures thereof. The thermoplastic polymeric material is preferably selected from polyphenylene sulfide (PPS), polyetherimines (PEI), polyether ether ketones (PEEK), polyolefins (particularly polyethylene or and/or polypropylene), polyethersulphones (particularly polyarylethersulphones), polyesters (particularly PET and PBT), polyamides (particularly nylon 6, nylon 6,6, nylon 11, nylon 12) and meta- and para-aramids (including those sold under the Kevlar®, Nomex® and Twaron®HM tradenames), and copolymers thereof. Suitable dry-fibre veils are available under the Optiveil™ and Optimat® tradenames from Technical Fibre Products, UK.

The dry-fibre veil of the present invention is adhered to the resin of the core layer but is not fully embedded into or impregnated by the resin of the core layer. The dry-fibre veil may be partially impregnated by the resin of the core layer, but the outermost portion of the veil is not impregnated by the resin of the core layer.

The dry-fibre veil of the present invention has an areal weight of from about 10 to about 50 g/m$^2$, preferably no more than about 35 g/m$^2$, preferably no more than about 30 g/m$^2$, preferably at least about 15 g/m$^2$, and preferably the areal weight is in the range of from about 10 to about 30 g/m$^2$, preferably from about 15 to about 25 g/m$^2$. Thus, it will be appreciated that the dry-fibre veil is not suitable in itself as a fibrous reinforcing material.

The dry-fibre veil of the present invention preferably has a thickness of from about 20 to about 300 μm, preferably from about 60 to about 200 μm, preferably from about 60 to about 150 μm.

The Pre-Preg

The pre-preg described herein preferably exhibits a low permeability to air. Such pre-pregs have been found to be particularly advantageous wherein the prehensile force is vacuum, i.e. wherein the astrictive end-effector is or comprises a suction cup. The permeability to air is such that a 100×100 mm sample of the pre-preg is retained for at least 60 seconds by a silicone suction cup of external diameter 22 mm and working internal diameter 20 mm exerting a vacuum defined by an open flow-rate of 20 liters/min prior to contact with the surface of the pre-preg.

Preferably, the permeability to air is such that the flow rate through the pre-preg is no more than 18 liters/min, and preferably no more than 15 liters/min, measured when the pre-preg has been retained for 60 seconds by a silicone suction cup of external diameter 22 mm and working internal diameter 20 mm exerting a vacuum level defined by an open flow-rate of 20 liters/min prior to contact with the surface of the pre-preg.

Additionally, the pre-preg described herein can also be measured for air permeability according to ASTM D737-04. The air permeability of the prepreg measured according to ASTM D737-04 is preferably no more than 4 $cm^3/s/cm^2$, preferably no more than 1 $cm^3/s/cm^2$, preferably no more than 0.1 $cm^3/s/cm^2$, and preferably no more than 0.01 $cm^3/s/cm^2$.

The air permeability is measured at ambient temperature, i.e. a temperature from about 15 to about 30° C., more typically 18 to about 23° C., and preferably 20° C. It will be appreciated that the permeability is measured in this way prior to curing of the pre-preg in the process of the present invention, i.e. the permeability is the permeability of the pre-preg that is disposed into or onto the mould in step (b) of the process.

As described herein, the surface of the pre-preg exhibits low tack. Preferably, the tack of the surface of the pre-preg is such that, after a 100×100 mm sample of the pre-preg has been retained for 60 seconds by a silicone suction cup of external diameter 22 mm and working internal diameter 20 mm exerting a vacuum defined by an open flow-rate of 20 liters/min prior to contact with the surface of the pre-preg, the pre-preg sample drops from the suction cup within a period of no more than 1 second after discontinuation of the vacuum. The tack is measured in this way at ambient temperature, i.e. a temperature from about 15 to about 30° C., more typically 18 to about 23° C., and preferably 20° C. It will be appreciated that the tack is measured in this way prior to curing of the pre-preg in the process of the present invention, i.e. the tack is the tack of the pre-preg that is disposed into or onto the mould in step (b) of the process.

The pre-preg is preferably flexible at ambient temperature (preferably at 20° C.) in its uncured state. The pre-preg described herein can be measured for stiffness according to ASTM D1388-96 option A. Preferably the pre-preg has a bending length no more than 175 cm, preferably no more than 150 cm and preferably no more than 125 cm, measured according to ASTM D1388-96 option A.

The pre-preg may be prepared by any conventional technique in the art, by disposing the surface layer on each surface of the core layer, i.e. the impregnated dry fibre preform described hereinabove.

Preferably, a surface layer is disposed on both surfaces of the core layer.

The Automated Process for Preparing a Moulded Article

To form a moulded article, a plurality of pre-pregs is laid up into or onto a mould (often referred to as moulding tool) in a stacking arrangement to form a "pre-preg lay-up". The pre-preg plies within the lay-up may be positioned in a selected orientation with respect to one another. For example, pre-preg lay-ups may comprise pre-preg plies having uni-directional fibre arrangements, with the fibres oriented at a selected angle θ, e.g. 0°, 45°, or 90°, with respect to the largest dimension (typically defined as the length) of the lay-up. Once in place, the pre-pregs in the lay-up are cured as described hereinbelow.

According to the present invention, the layup process is an automated process.

The laminar pre-preg is preferably provided in the form of a wound roll of the pre-preg material (typically wound around a core of cardboard or other suitable material). The automated process of the present invention typically therefore comprises the step of unwinding the pre-preg material onto a flat and level base, suitably securing the pre-preg material in position by a suitable securing means as is conventional in the art. One or more pre-determined shapes are then cut from the web of pre-preg material, suitably using a mechanised and automated cutting means as is known and conventional in the art. One suitable cutting means is a high-frequency rotationally operating oscillating saw blade. During the cutting step, the web of pre-preg may be supported and retained in place by a suitable retaining member. The pre-determined cut shape remains in the plane of the web of the remaining pre-preg material, and the location of the pre-determined cut pre-preg shape at this point in the process typically defines said starting position.

The pre-preg (or the pre-determined cut pre-preg shape) is then conveyed by an automated conveying member from said starting position to a finishing position in or on the mould. Optionally, the cut pre-preg shape may be conveyed from said starting position to an intermediate position between said starting and finishing positions, for instance to a stacking position where the cut pre-preg shapes are stacked or wherein the cut pre-preg shapes are deposited in or on a release film or lay-up mould or mould loading device, and then conveyed from the intermediate position to said finishing position in or on said mould. Lamination of the pre-pregs may suitably be effected at said intermediate position, particularly wherein the cut pre-preg shapes are deposited in or on a release film or lay-up mould. Alternatively, a cut pre-preg shape may be conveyed directly from said starting position to said finishing position, which may further improve the speed and efficiency of the process.

The automated conveying member grasps the pre-preg material by applying a prehensile force thereto.

As used herein, the term "prehensile force" refers to any grasping force, including but not limited to application of force on a plurality of surfaces of the pre-preg material (i.e. wrapping round). Preferably, the prehensile force is selected from one or more (and preferably from only one) of vacuum, magneto-adhesion and electro-adhesion, and preferably said prehensile force is vacuum. Preferably, the term "prehensile force" refers to the application of force on a single surface of the pre-preg material. The prehensile force may act at a single attachment point on the surface of the pre-preg material or may act simultaneously at a plurality of attachment points on the surface of the pre-preg material. Where the prehensile force acts at a plurality of attachment points on the surface of the pre-preg material, then said plurality of attachment points are located on a single surface of the pre-preg material.

Thus, according to the present invention, the laminar pre-preg is preferably conveyed from the starting position to the finishing position by the application of suction to one or more attachment points of a surface (preferably a single surface) of the pre-preg material.

After the pre-preg material has been conveyed to said finishing position by said automated conveying member, the prehensile force is discontinued.

The conveying sequence is then repeated for one or more further laminar pre-preg(s).

After the desired or pre-determined number of pre-pregs has been laid in or on the mould, the pre-pregs are typically compressed by a mould press, so that the plurality of pre-pregs is in contact with the desired and appropriate moulding surface(s) of the mould, for instance in a mould cavity. The moulding surfaces of the mould are preferably heated, preferably isothermally heated. Thus, preferably the plurality of pre-pregs is compressed in a press-moulding process where the mould tool is at a fixed temperature, which is referred to in the art as isothermal tooling. The temperature of the moulding surfaces of the mould, or of the mould tool, is fixed at a pre-determined temperature to cure the pre-pregs. The pre-pregs are heated rapidly, and as quickly as the mould tool allows.

The automated conveying member is suitably a pivoted or articulated robot arm which is movable (including rotational movement) along multiple axes or dimensions.

Preferably, the automated conveying member comprises one or more astrictive end effector(s) to convey said pre-preg. Preferably the automated conveying member comprises one or more suction cup(s) to convey said pre-preg. The suction cups may be of any suitable shape, and typically present a substantially circular contact surface to the pre-preg. A suction cup typically contacts the pre-preg over a surface of the pre-preg which has an area having a largest dimension (typically a diameter) of from about 1 cm to about 10 cm; it will be appreciated that this area is the area prescribed by the outer periphery or circumference of a suction cup. The astrictive end-effector(s) or suction cup(s) are connected to a vacuum source by any suitable hose arrangement.

The automated process of the present invention is preferably a robotic pick-and-place process, for which automated machines and control systems are already known in the art. US-2005/0042323, for example, discloses an automated process for handling conventional resin composite materials using a plurality of vacuum grippers.

One of the advantages of the present invention is that the pre-preg does not require (and indeed does not comprise or is not otherwise associated with) a protective removable interleave disposed on an external surface of the pre-preg. Thus, it will be appreciated that the automated process does not comprise a step of removing a protective removable interleave from a surface of the pre-preg.

A further advantage of the present invention is that the surfaces of the pre-preg material are tack-free at ambient temperature. The automated process of the present invention does not therefore require (and indeed does not involve a step which comprises) the removal of residual resin from the surfaces of the automated conveying member which have contacted and conveyed the pre-preg material.

The automated process is preferably conducted in an environment at ambient temperature or above, and preferably at ambient temperature. In this context, the "ambient temperature" is the temperature of the surrounding atmosphere within the manufacturing facility, in whichever climate that may be located, and typically refers to a temperature in the range of from about 15 to about 30° C., more typically 18 to about 23° C., and typically about 20° C. It will be appreciated that the term "conducted in an environment at ambient temperature" does not refer to the localised temperature increases associated with the curing cycle described hereinbelow.

After the desired or pre-determined number of pre-pregs has been laid in or on the mould, the plurality of pre-pregs are cured, preferably thermally cured. Curing is preferably effected while the pre-pregs are located in or on the mould, and preferably while the pre-pregs are compressed in a mould cavity, preferably a heated mould-cavity, preferably an isothermally heated mould cavity. Thus, as described above, curing is preferably effected in a press-moulding process where the mould tool is at a fixed temperature (isothermal tooling).

In the present invention, thermal curing is conducted using a cure temperature of at least 100° C., preferably at least 120° C., preferably greater than 120° C., preferably at least 125° C., preferably at least 130° C., and preferably in the range of from about 130° C. to about 150° C. Preferably, thermal curing is conducted using a cure cycle having a duration of no more than 30 minutes, preferably no more than 15 minutes, preferably no more than 10 minutes, preferably no more than 5 minutes. The cure cycle duration as defined herein is the period for which the plurality of pre-pregs is subjected to the pre-determined cure temperature. The cure cycle duration does not include the ramp phase or the cool-down phase. As noted hereinabove, the present invention is primarily directed to press-moulding processes where the mould tool is at a fixed temperature (isothermal tooling), and heats the pre-pregs as rapidly as possible.

In an alternative embodiment, thermal curing may be conducted in an oven or autoclave, and may be conducted under vacuum (for instance in a vacuum bag as known in the art), suitably conducted at elevated pressure, for instance at a pressure of from about 2 to about 10 bar. In this embodiment, the cure temperatures and cure cycle durations described hereinabove are also applicable, but typically the heating and cooling rates are controlled. Preferably, the heating rate during the ramp phase is from about 1 to about 5° C./min, preferably from about 1 to about 3° C./min. Preferably, the cooling rate in the cool-down phase is from about 1 to about 5° C./min, preferably from about 1 to about 3° C./min to 60.

The process further comprises the step of removing the moulded cured pre-preg(s) from the mould to provide the moulded article.

In the automated process of the present invention, it will be appreciated that the dry-fibre veil remains on the fibre-reinforced composite material during and after curing. Thus, the moulded article produced by the process comprises a plurality of the dry-fibre veils.

Applications

The moulded articles prepared by the process described herein are particularly suitable as components for transport applications, and particularly the automotive industry. The automotive components prepared by the present invention are particularly suitable as mid- or high-volume automotive parts, in which cost and speed of production are paramount. The present invention provides a process in which the cutting and handling of pre-preg materials is greatly simplified, providing advantages of efficiency and economy. The lay-up time according to the present invention is significantly reduced, allowing a reduction in the unit cost per component and/or allowing the high volume of component production desired in the automotive industry.

Various embodiments of the invention are described herein. It will be recognised that features specified in each embodiment may be combined with other specified features to provide further embodiments.

Measurement Methods

The pre-pregs described herein were characterised as follows.

Tack-Free

The samples were qualitatively assessed for tack by the following test. Two 100×100 mm squares were cut out of the final pre-preg and stacked on top of one another. A 1 kg weight was applied evenly across the area of the two-ply assembly and allowed to rest for 1 minute before removal. This experiment was performed at an ambient temperature of 20° C. On removal of the weight, the two plies were separated and the degree of adhesion assessed. If the two plies separated immediately, with no adhesion between them, the pre-preg was considered to be tack-free.

Tack Level

The samples were also qualitatively assessed for tack by a simple hand-touch test. The pre-preg samples were first placed under vacuum (28 mm Hg) for 10 minutes, and the tack level was tested by touch, and graded as follows:
- Grade 1—Tack removed completely, not sticky to touch
- Grade 2—Very low tack; very slightly sticky to touch
- Grade 3—Low tack; slightly sticky to touch
- Grade 4—Medium tack; sticky to touch
- Grade 5—High tack The pre-pregs of utility in the present invention exhibit a tack level of Grades 1 or 2, preferably Grade 1.

Vacuum Cup Performance

Unless otherwise stated, the permeability and tack performance of the pre-preg when conveyed by a vacuum cup was assessed in the following two-part test, conducted at ambient temperature (i.e. a temperature from about 15 to about 30° C., more typically 18 to about 23° C., and preferably 20° C.).

Figure 2:
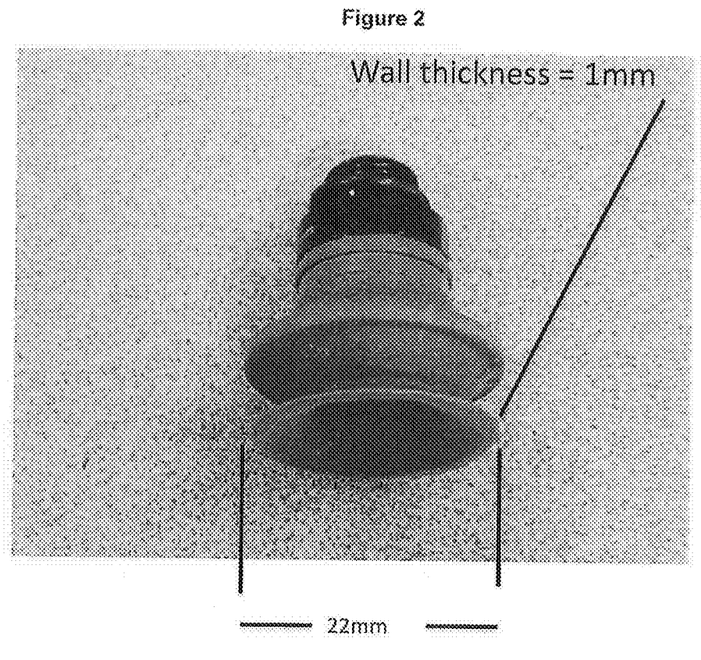
FIGS. 2 and 3 illustrate the suction cup used in the Vacuum Cup Performance Test.
Figure 3:
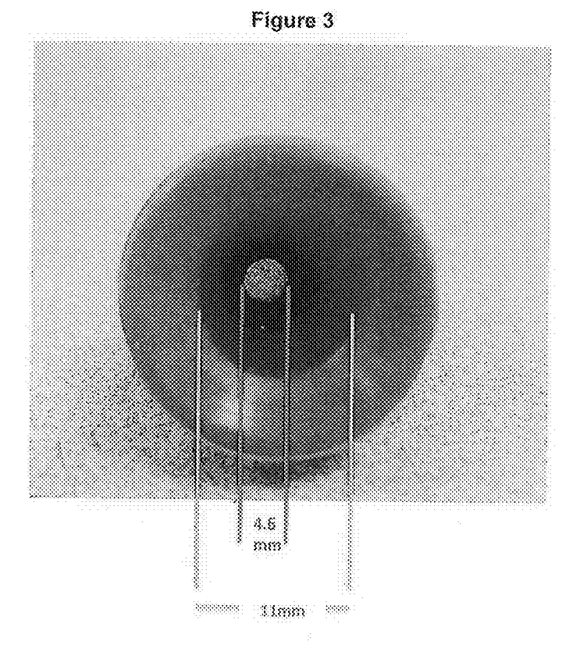

Part (i): The permeability of the pre-preg was tested by contacting a silicone bellow suction cup (model B20; available from Piab, UK) with the surface layer of the pre-preg (sample size 100×100 mm). The suction cup, which is illustrated in FIGS. 2 and 3, had an external diameter of 22 mm and a working internal diameter of 20 mm. The external and internal diameters are those of the suction cup in the uncompressed state, and are measured at the end of the suction cup which contacts the pre-preg (i.e. the proximal end, relative to the point of contact with the pre-preg) and in the plane defined by the contact area with the pre-preg. The suction cup had a wall thickness of 1 mm. The narrowest part of the bellow of the suction cup was 11 mm. The suction cup was attached to a vacuum pump via an aperture of approximately 4.6 mm located at the distal end of the suction cup relative to the point of contact with the pre-preg. The suction cup exerted a vacuum level defined by an open flow-rate of 20 liters/min prior to contact with the surface of the pre-preg, to assess whether the suction cup could hold the weight of the sample for a period of 60 seconds. The permeability was graded as follows.
- Good vacuum hold: the sample was held by the suction cup
- Poor vacuum hold: the sample could not be retained by the suction cup The pre-pregs of utility in the present invention should exhibit a good vacuum hold.

Part (ii): For pre-pregs which exhibited a good vacuum hold, the vacuum supply was then removed to assess the release of the sample from the suction cup, and hence to provide a measure of the tack of the pre-preg surface. The release performance was graded as follows:
- Grade 1—Good release; sample does not stick to vacuum cup and drops immediately on removal of vacuum
- Grade 2—Poor release; sticks slightly to vacuum cup; delayed drop on removal of vacuum
- Grade 3—Very poor release; sticks to vacuum cup on removal of vacuum The pre-pregs of utility in the present invention should exhibit a release of Grade 1.

Figure 1:
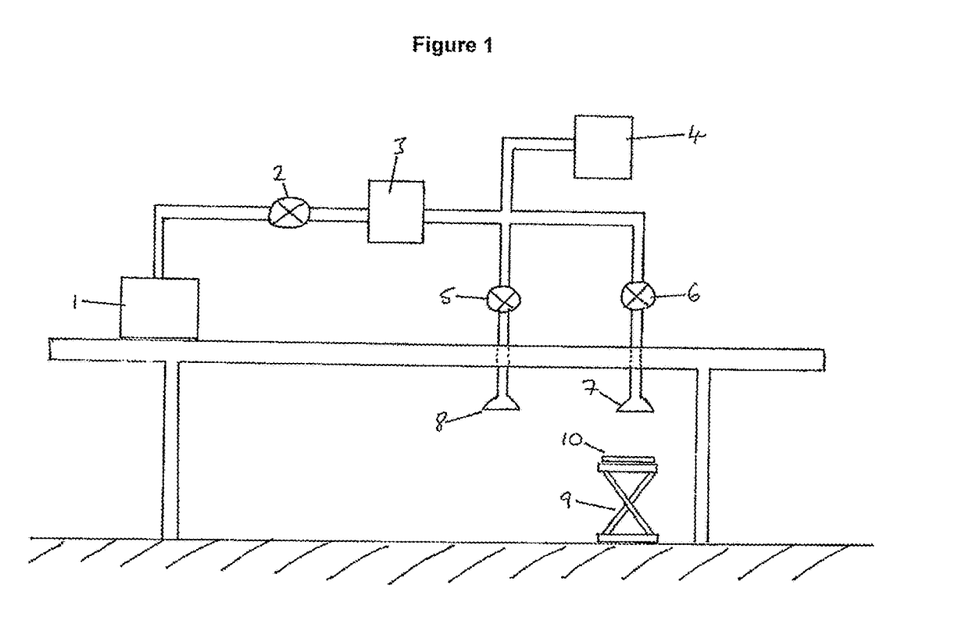
FIG. 1 illustrates the procedure for the Vacuum Cup Performance Test.

With reference to FIG. 1, the procedure of the test was as follows. The sample (10) to be tested is placed on trestle table (9) which is movable in the vertical direction. With valves A and B (2, 5) closed and valve C (6) open, vacuum pump (1) is switched on, valve A (2) is opened and the open flow rate set to 20 liters/min using flow-meter (3). The trestle table (9) is raised so that the sample (10) is contacted with suction cup (7). The trestle table (9) is lowered away from suction cup (7) to determine whether suction cup (7) held the weight of the sample for 60 seconds. A sample which is not able to be lifted from the trestle table by the suction cup is too permeable and/or too tacky for utility in the present invention. If the sample remains in contact with the suction cup for 60 seconds, the vacuum level at 60 seconds is recorded via vacuum gauge (4) and the flow rate at 60 seconds is recorded at flow-meter (3), i.e. with the sample (10) blocking the opening in order to assess the permeability of the sample. A higher flow rate indicates a higher permeability. The flow rate measured at flow-meter (3) at 60 seconds is preferably no more than 18 liters/min, and preferably no more than 15 liters/min, for the pre-preg to have utility in the present invention, since otherwise the pre-preg is too permeable. Valve A (2) is then closed and the vacuum vented by opening valve B (5), and the time for the sample to release from the suction cup is recorded. The in-line distance (i.e. piping length) between cup (7) and cup (8) is approximately 30 cm. A pre-preg sample should have a release time of no more than 1 second after discontinuation of the vacuum for utility in the present invention, otherwise the pre-preg is too tacky.

In a modified version of the vacuum cup performance test, the open flow rate is set to 50 liters/min and the sample (10) offered to the suction cup as before. For those samples which were held by suction cup (7) for at least 60 seconds, the flow rate at flow-meter (3) can be measured at 60 seconds, i.e. with the sample (10) blocking the opening in order to assess the permeability of the sample. The time for the sample to release from the suction cup can be recorded by closing valve A (2) and venting the vacuum by opening valve B (5). A pre-preg according to the present invention should have a release time of no more than 1 second after discontinuation of the vacuum; otherwise the pre-preg is too tacky.

Air Permeability According to ASTM D737-04

The air permeability of the pre-preg was additionally measured according to ASTM D737-04 at 20° C. using a Shirley Air Permeability tester, and using a 1 inch (approximately 2.54 cm) diameter orifice (i.e. a test area of 5.07 cm$^3$), and a water pressure differential of approximately 125 Pa.

Flexibility

Flexibility of the pre-preg was evaluated qualitatively by assessing the resistance to winding the pre-preg at an ambient temperature of 20° C. onto a cardboard core with an outer diameter of 4 inches (approx. 10.16 cm). In addition, the pre-preg flexibility may also qualitatively assessed by subjecting it to a 180° fold test and the fibre breakage assessed visually under magnification. In addition, the pre-preg was also measured for stiffness using ASTM D 1388-96, option A—Cantilever test at an ambient temperature of 20° C., using a specimen size of 350×25 mm (i.e. longer than the standard specimen length of 200 mm).

Cure Conversion

Differential Scanning Calorimetry (DSC) was utilized to determine the cure conversion under a given set of cure conditions, substantially in accordance with ISO-11357-5:2013. The residual enthalpy (remaining heat of reaction) detected during the DSC measurement is correlated to the total enthalpy (heat evolved) of the curing reaction. DSC measurements are performed by heating from 30° C. to a temperature that is sufficient to capture the entire curing reaction (225° C. is sufficient for the resins of interest described herein) at a heating rate of 10° C./min. The sample size is about 5-10 mg. The cure conversion (%) is calculated as:

$$\text{cure conversion (\%)} = \frac{(\Delta Hi - \Delta He)}{\Delta Hi} \times 100$$

wherein:

ΔHi is the enthalpy generated by the uncured test sample during heating from 30° C. to 225° C.; and ΔHe is the enthalpy generated by a cured sample during the heating scan of heated from 30° C. to 225° C.

The invention is further illustrated with reference to the following non-limiting examples.

EXAMPLES

Example 1

A series of pre-pregs was prepared from a laminar sheet of a carbon fibre-reinforced composite material (0/90° biaxial fibre orientation) having and an areal weight of 600 gsm. The sheet comprised an epoxy resin (MTM®57; available from Cytec) comprising 42 wt % resin by weight of the composite material. The resin has a high-tack at room temperature. The resin was applied as a film to the carbon-fibre reinforcement and passed through heated rollers to generate the laminar sheet having a thickness of 640 µm in a conventional manner. On one side of the sheet was disposed a protective polymer interleave (LDPE; 80 µm), and on the opposite side was disposed a dry-fibre veil, as detailed in Table 1 below. Samples of the pre-preg were then assessed for tack level and vacuum cup performance using the test rig shown in FIG. 1. A standard industrial vacuum (1) was supplied through a valve and air flow regulator (2 & 3). The vacuum supplied two vacuum cups (7 & 8) each with valves (5 & 6). A vent system was used to release residual vacuum pressure in the system (4). The pre-preg sample (10) was presented to one of the vacuum cups using an elevating platform (9). The vacuum was supplied to the vacuum cup and the elevating platform was lowered. The level of vacuum hold was then assessed. The vacuum was held for 60 seconds before the vacuum in the system was released. The level of release was then assessed. Details of the vacuum cups using are shown in FIGS. 2 and 3. The results are given in Table 1 below.

TABLE 1

| Example | Veil | Tack level grade | Vacuum cup performance test |
|---------|------|------------------|------------------------------|
| 1-a | PEI; 20 gsm (2 layers of 10 gsm) | 2 | (i) Permeability: Good vacuum hold (ii) Release: Grade 1 |
| 1-b | Carbon; 30 gsm | 1 | (i) Permeability: Good vacuum hold (ii) Release: Grade 1 |

Materials:
PEI veil: T2570-05 (Technical Fibre Products, UK)
Carbon Veil: T2622-04 (Technical Fibre Products, UK)

The examples demonstrate that a pre-preg comprising a dry-fibre veil is able to be manipulated in an automated process according to the present invention.

Example 2

A pre-preg (1250 mm×1250 mm) was prepared from the same laminar sheet as described for Example 1. On each side of the sheet was disposed two layers of a dry-fibre polyester veil (PM25; 25 gsm; available from Technical Fibre Products) and the pre-preg vacuum debaulked for 10 minutes. The pre-preg was then rolled and then unrolled before testing. Samples of the pre-preg were assessed for tack level and vacuum cup performance as described herein. The results are given in Table 2 below. A sample of the pre-preg was also tested in the tack-free test, and the surfaces were found to be tack-free.

TABLE 2

| Example | Veil | Tack level grade | Vacuum cup performance test |
|---------|------|------------------|------------------------------|
| 1 | Polyester; 50 gsm (2 layers of 25 gsm) | 1 | (i) Permeability: Good vacuum hold (ii) Release: Grade 1 |

Figure 4:
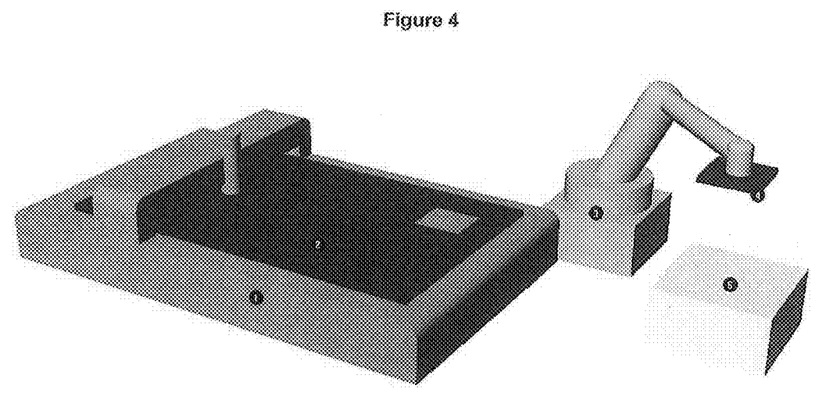
FIG. 4 illustrates the automated manufacturing test facility used for the present invention.

The sample was then tested in an automated manufacturing test facility. See FIG. 4 for equipment arrangement. When rolling/unrolling the sample (2), the pre-preg was easily unrolled, with no self-adhesion. An automated cutter (1) was used to cut preform shapes from the sample, and the material cut cleanly. A 125 mm square sample (4) was cut by an automated cutter and a robotic pick and place arm actuator with a suction cup end-effector (3) used for lay-up of the sample in a mould (5); the sample was released cleanly.

The example demonstrates that a pre-preg comprising a dry-fibre veil is able to be manipulated in an automated process according to the present invention.

Example 3

A series of pre-preg samples was prepared from a similar, relatively high-tack laminar sheet as used in Example 1 except that the resin was MTM®710 epoxy resin (available from Cytec Industrial Materials (Derby) Ltd.). A variety of dry-fibre veils (all available from Technical Fibre Products (UK); see table 3 below) was disposed on both sides of the laminar sheet to generate the pre-preg. A control sample was prepared without the dry-fibre veil on either side. The samples were vacuum debaulked for 5 minutes. The samples of the invention were then tested in the same tack test used in Example 1. All Samples were found to have good vacuum hold and Grade 1 tack release. Samples of the pre-preg were then tested in the modified version of the vacuum cup performance test and the time for the sample to release from the suction cup was recorded. Both sides of the pre-preg were tested, i.e. the high resin content side (which is the side on which the resin film was laid on the fibre reinforcement layer prior to passing through heated rollers) and the opposite, low resin content side. The results are presented in Table 3 below.

TABLE 3

| | | | Drop Delay (s) | |
|---|---|---|---|---|
| Veil # | Surface Layer (TFP product) | Veil Weight (gsm) | Higher resin content side | Low resin content side |
| Control | None | n/a | 23 | 8 |
| 1 | E Glass (20153A0010TFP) | 10 | 1 | <1 |
| 2 | E Glass (20103A0017TFP) | 17 | <1 | <1 |
| 3 | E Glass (20103A0022TFP) | 22 | <1 | <1 |
| 4 | E Glass (20103A0034TFP) | 34 | <1 | <1 |

TABLE 3-continued

| Veil # | Surface Layer (TFP product) | Veil Weight (gsm) | Drop Delay (s) Higher resin content side | Drop Delay (s) Low resin content side |
|---|---|---|---|---|
| 5 | Polyester (20254A0012TFP) | 12 | <1 | <1 |
| 6 | Polyester (20254A0025TFP) | 25 | <1 | <1 |
| 7 | Carbon (20301A0017TFP) | 17 | <1 | <1 |
| 8 | Carbon (20301A0020TFP) | 20 | <1 | <1 |
| 9 | Carbon (20352A0025TFP) | 25 | <1 | <1 |
| 10 | Carbon (20301A0030TFP) | 30 | <1 | <1 |

For effective and reliable use of a suction cup member to be used as part of an automated conveyor, the drop delay should be no more than 1 second. The results in Table 3 demonstrate that pre-preg core with no surface layer is not suitable to be used in an automated conveyor using suction cup members. The results further demonstrate that the provision of a dry-fibre veil is effective in reducing the tack level of a tacky fibre-reinforced composite material. A pre-preg in which a dry-fibre veil constitutes the external surface is therefore able to be handled in a pick and place automated process without use of a polymeric interleave.

The invention claimed is:

1. An automated process for preparing a moulded article from a plurality of pre-pregs comprising the steps of:
   (a) providing a mould;
   (b) disposing a laminar pre-preg into or onto said mould by an automated conveying member which applies a prehensile force to said pre-preg to convey said pre-preg from a starting position to a finishing position, wherein said finishing position is in or on said mould;
   (c) repeating step (b) at least once to dispose one or more further pre-pregs into or onto said mould;
   wherein said laminar pre-preg is a fibre-reinforced curable composite material, wherein said pre-preg comprises a core layer having a first surface and a second surface and further comprises a surface layer disposed directly on each of said first and second surfaces of said core layer, wherein said core layer comprises one or more layer(s) of reinforcing fibres impregnated with a curable resin, and wherein said surface layer comprises a dry-fibre veil having an areal weight from about 10 to about 50 g/m², the dry-fibre veil being adhered to the curable resin of the core layer; and
   wherein the prehensile force is applied by said automated conveying member directly to the external surface of said surface layer of said pre-preg.

2. The automated process of claim 1 wherein said prehensile force is selected from one or more of vacuum, magneto-adhesion and electro-adhesion.

3. The automated process of claim 2 wherein said automated conveying member comprises an astrictive end effector to convey said pre-preg from said starting position to said finishing position in or on said mould, wherein said pre-preg is conveyed from said starting position to an intermediate position between said starting and finishing positions, wherein said intermediate position is a stacking position where said pre-preg is stacked or wherein said intermediate position is a position where said pre-preg is deposited in or on a release film or lay-up mould or mould loading device, and wherein said pre-preg is then conveyed from the intermediate position to said finishing position in or on said mould.

4. The automated process of claim 3 wherein steps (b) and (c) are conducted in an environment at ambient temperature in the range of 18° C. to 23° C.

5. The automated process of claim 4 wherein said process further comprises the step of thermally curing said pre-pregs to form the molded article and said thermal curing is conducted at a cure temperature of greater than 120° C.

6. The automated process of claim 5 wherein the dry-fibre veil remains on the fibre-reinforced composite material during and after curing.

7. The automated process of claim 6 wherein the areal weight of the dry-fibre veil is from about 15 to about 25 g/m².

8. The automated process of claim 6 wherein the dry-fibre veil is a woven or non-woven fabric.

9. The automated process of claim 6 wherein the fibres of the dry-fibre veil comprise fibres selected from: carbon fibres, glass fibres, boron fibres, basalt fibres, quartz fibres, cellulose fibres, ceramic fibres, and thermoplastic polymer fibres.

10. The automated process of claim 6 wherein the fibres of the dry-fibre veil comprise polymeric material selected from polyphenylene sulfide (PPS), polyetherimine (PEI), polyether ether ketone (PEEK), polyolefin, polyethersulphone, polyester, polyamide and meta- and para-aramids, and copolymers thereof.

11. The automated process of claim 1 wherein the surface layers of the laminar pre-preg are tack-free at ambient temperature prior to curing.

12. The automated process of claim 11 wherein the tack at ambient temperature of the surface layers of the pre-preg prior to curing is such that, after a 100×100 mm sample of the pre-preg has been retained for 60 seconds by a silicone suction cup of external diameter 22 mm and working internal diameter 20 mm exerting a vacuum defined by an open flow-rate of 20 liters/min prior to contact with the surface of the pre-preg, the pre-preg sample drops from the suction cup within a period of no more than 1 second after discontinuation of the vacuum.

13. The automated process of claim 11 wherein said pre-preg is flexible at 20° C. in its uncured stated.

14. The automated process of claim 1 wherein the core layer comprises from about 40 to about 60 wt % of curable resin, by total weight of the core layer.

15. The automated process of claim 1 wherein the layer(s) of reinforcing fibres of the core layer are fully impregnated with the curable resin and the curable resin comprises a curing agent and one or more resins selected from the group consisting of monofunctional and multifunctional epoxy resins.

16. The automated process of claim 15 wherein the curable resin comprises:
   (i) a first difunctional epoxy resin selected from bisphenol A epoxy resins; and/or
   (ii) a second difunctional epoxy resin selected from bisphenol F epoxy resins;
   in combination with one or more of the epoxy resin(s) selected from:
   (iii) an epoxy phenol novolac (EPN) resin;
   (iv) an epoxy cresol novolac (ECN) resin;
   (v) a trifunctional epoxy resin; and
   (vi) a tetrafunctional epoxy resin.

17. The automated process of claim 1 wherein the core layer exhibits an areal weight of from about 300 to about 1500 gsm.

18. The automated process of claim 1 further comprising the steps of preparing said pre-preg by:
   a. providing a dry fibre preform comprised of one or more layers of reinforcing fibres;
   b. impregnating said dry fibre preform with said curable resin, wherein said curable resin is liquid; and
   c. disposing said surface layer onto each surface of the impregnated dry fibre preform.

* * * * *